(No Model.)

H. A. BANNING.
BRAKE SHOE.

No. 271,207. Patented Jan. 30, 1883.

ATTEST:
J. A. Murdle.
L. E. Talbot

INVENTOR:
Hubert A. Banning

UNITED STATES PATENT OFFICE.

HUBERT A. BANNING, OF NEW YORK, N. Y.

BRAKE-SHOE.

SPECIFICATION forming part of Letters Patent No. 271,207, dated January 30, 1883.

Application filed May 31, 1882. (No model.)

*To all whom it may concern:*

Be it known that I, HUBERT A. BANNING, of the city of New York, in the county and State of New York, have invented a new and useful Improvement in Car-Brake Shoes, of which the following is such a full, clear, concise, and exact description as will enable others skilled in the art to which my invention appertains to make and use the same, reference being had to the accompanying drawings, forming part of this specification.

Figure 1:
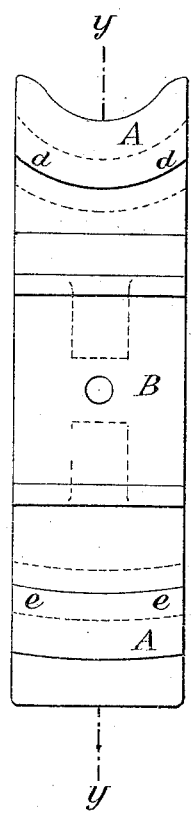
Figure 2:
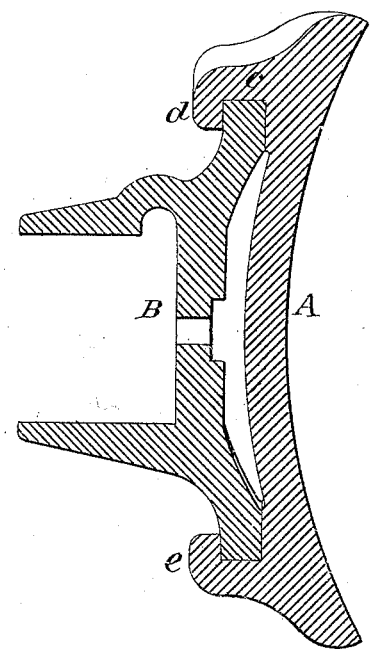

In the drawings, Figure 1 is a plan view of the brake-shoe and brake-head when attached together, and Fig. 2 is a sectional side view of the same on the line $y\ y$ of Fig. 1.

Heretofore brake-shoes have been made in two parts; but in most cases such parts have been secured together by the use of pins, keys, or bolts, which have to be removed and replaced whenever the brake-shoes are changed, thus consuming time and causing inconvenience, aside from the fact that such pins, keys, or bolts have to be fitted to suit the particular construction of the brake-shoes with which they are used, and are often liable to be lost while the shoe is in use, in which case it will drop or work off the brake-head.

Other brake-shoes have been made without pins, keys, or bolts; but their use has been attended with a constant rattle and clatter, which is very objectionable, and they were not adapted to be put on or taken off from the side, but when changed the brake-beam had to be swung back far enough to admit of the lugs as well as the brake-shoe passing between the brake-head and the wheel.

Some attempts have also been made to construct a practical brake-shoe by having the upper and lower ends of the brake-head curved in opposite directions, the curves forming parts of a circle or circles, the centers of which are somewhere between the upper and lower ends of the brake-head. In such cases, however, the ends of the brake-head form projections, so that the shoe can only be put on or taken off by being turned obliquely across the brake-head, and consequently the shoe interferes with the flange of the wheel unless the brake-beam be pressed outward from the wheel sufficiently to permit the shoe to clear it. Aside from this difficulty brake-shoes of such form are of very little if any practical utility, as they are liable to come off should any displacement of the ends be occasioned by a jarring, as in that event the tendency would be to work off instead of coming back into position, and, so far as I am aware, brake-shoes of this kind have never been used at all.

The object of my invention is to make a brake-shoe in such a way as to avoid the difficulties heretofore experienced.

In the drawings, A represents the brake-shoe, and B the brake-head, or that part which is permanently fixed to the brake-beam. That portion of the brake-head upon which the shoe rests or has its bearing is recessed or hollowed out so as to form a concavity or surface in the form of an arc of a circle facing upward, as shown at $c$. The opposite end of the brake-head is also curved in the same direction, but instead of being hollowed out is segmental. The curves shown in the drawings have a common center outside of the brake-head.

The brake-shoe has on its back side two lugs, $d\ e$, corresponding respectively in position and curve with the curved portions of the brake-head. One of these lugs catches over and the other under the curved parts of the brake-head, with which they respectively correspond, thus securing the shoe to the brake-head and providing against the upward and downward strain when the brakes are applied.

It will be seen that a brake-shoe having its bearing upon a recessed curve or concavity, as explained, may be put on or taken off from either side, as it may be made to swing around the brake-head and into place. Besides this it will have a strong tendency to always remain in position or to immediately resume its position should it be slightly displaced by any sudden jarring. As the upper and lower curves on the brake-head and the corresponding curves on the lugs $d\ e$ of the shoe face in the same direction, there will be no difficulty in putting the shoe on or taking it off, for it need not cross the brake-head, and hence a workman will be enabled to either put the shoe on or take it off without having the trouble and annoyance that would be occasioned by such crossing, and in which case a slackening of the brake-rod would be required in order to effect an outward pressure of the brake-beam, so as to permit the shoe to clear the wheel, thus consuming valuable time.

While a brake-shoe of the kind hereinbefore described is very simple, yet it possesses peculiar merits, and is especially adapted to meet the requirements of cases where an atmospheric brake is used and the shoe swings close to the wheel. At the same time it is of great utility in all cases.

Having thus described my invention, what I claim as new, and desire to secure by Letters Patent, is—

In combination with the brake-head B, having curves facing in the same direction, the shoe A, having lugs $d$ $e$, corresponding with such curves, substantially as described.

HUBERT A. BANNING.

Witnesses:
THOS. M. WYATT,
J. E. TALBOT.